(12) United States Patent
Kumar

(10) Patent No.: US 11,017,177 B2
(45) Date of Patent: May 25, 2021

(54) NEURAL NETWORK SYSTEMS AND METHODS FOR TARGET IDENTIFICATION FROM TEXT

(71) Applicant: CONDUENT BUSINESS SERVICES, LLC, Florham Park, NJ (US)

(72) Inventor: Niraj Kumar, Karnataka (IN)

(73) Assignee: Conduent Business Services, LLC, Florham Park, NJ (US)

( * ) Notice: Subject to any disclaimer, the term of this patent is extended or adjusted under 35 U.S.C. 154(b) by 180 days.

(21) Appl. No.: 16/454,771

(22) Filed: Jun. 27, 2019

(65) Prior Publication Data

US 2020/0410054 A1 Dec. 31, 2020

(51) Int. Cl.
*G06N 3/04* (2006.01)
*G06F 40/30* (2020.01)
*G06N 3/08* (2006.01)

(52) U.S. Cl.
CPC ........... *G06F 40/30* (2020.01); *G06N 3/0454* (2013.01); *G06N 3/08* (2013.01)

(58) Field of Classification Search
CPC ........... G06N 3/08; G06N 3/04; G06N 3/0454
See application file for complete search history.

(56) References Cited

U.S. PATENT DOCUMENTS

| | | | |
|---|---|---|---|
| 8,670,526 B2 | 3/2014 | Clawson | |
| 9,037,464 B1 | 5/2015 | Mikolov et al. | |
| 9,195,990 B2 | 11/2015 | Hahn et al. | |
| 9,311,599 B1 | 4/2016 | Attenberg et al. | |
| 10,255,269 B2 * | 4/2019 | Quirk | G06F 40/00 |
| 10,521,587 B1 * | 12/2019 | Agranonik | G06N 3/0445 |
| 2016/0078339 A1 * | 3/2016 | Li | G06N 7/005 706/20 |
| 2016/0099010 A1 * | 4/2016 | Sainath | G06N 3/0445 704/232 |

(Continued)

OTHER PUBLICATIONS

Tian, Chujie, et al. "A deep neural network model for short-term load forecast based on long short-term memory network and convolutional neural network." Energies 11.12 (2018) (Year: 2018).*

(Continued)

*Primary Examiner* — Jialong He
(74) *Attorney, Agent, or Firm* — Jones Robb, PLLC

(57) ABSTRACT

Neural network systems are provided that comprise one or more neural networks. The first neural network can comprise a convolutional neural network (CNN) long short-term memory (LSTM) architecture for receiving a primary data set comprising text messages and output a primary data structure comprising a text pattern-based feature. The second neural network can comprise a CNN architecture for receiving a secondary data sets derived from the primary data set and output a plurality of secondary data structures. The third neural network can combine the data structures to produce a combined data structure, and then process it to produce a categorized data structure comprising the text messages assigned to targets. The primary data set can comprise hate speech and the categorized data structure can comprise target categories, for example, hate targets. Methods of operating neural network systems and computer program products for performing such methods are also provided.

20 Claims, 7 Drawing Sheets

(56) References Cited

U.S. PATENT DOCUMENTS

2018/0025721 A1* 1/2018 Li .............................. G06N 3/08
704/232
2019/0166670 A1* 5/2019 Alfier ............... H04N 21/23418

OTHER PUBLICATIONS

Sosa, Pedro M. "Twitter sentiment analysis using combined LSTM-CNN models." Eprint Arxiv (2017): 1-9. (Year: 2017).*

Pitsilis, Georgios K., Heri Ramampiaro, and Helge Langseth. "Effective hate-speech detection in Twitter data using recurrent neural networks." Applied Intelligence 48.12 (2018): 4730-4742. (Year: 2018).*

Huang, Qiongxia, et al. "Deep sentiment representation based on CNN and LSTM." 2017 International Conference on Green Informatics (ICGI). IEEE, 2017. (Year: 2017).*

Badjatiya, P. et al., "Deep Learning for Hate Speech Detection in Tweets," IW3C2 WWW 2017 Companion; Perth Australia ACM 978-1-4503-4914-7/17/04 pp. 759-760 (2017).

Davidson, T. et al., "Automated Hate Speech Detection and the Problem of Offensive Language," 11th International Conference ICWSM pp. 512-515 (2017).

Del Vigna, F. et al., "Hate me, hate met not: Hate speech detection on Facebook," ITASEC17; Venice, Italy pp. 86-95 (2017).

El Sherief, M. et al., "Hate Lingo: A Target-Based Linguistic Analysis of Hate Speech in Social Media," Proc. of the 12th International AAAI Conf. on Web and Social Media Assoc. for the Advancement of Artificial Intell (www.aaai.org) pp. 42-51 (2018).

El Sherief, M. et al., "Peer to Peer Hate: Hate Speech Instigators and Their Targets," Proc. of the 12th International AAAI Conf. on Web and Social Media (ICWSM) pp. 52-61 (2018).

Gamebäck, B. & Sikdar, U., "Using Convolutional Neural Networks to Classify Hate-Speech," Proc. of the 1st Workshop on Abusive Language Online; Vancouver, Canada pp. 85-90 (2017).

Go, A. et al., "Twitter sentiment classification using distant supervision." CS224N Project Report; Stanford 1(12) (2009).

Goh, K.-I. et al., "Universal Behavior of Load Distribution in Scale-Free Networks," Physical Review Letters 87(27) 278701-1 to 278701-4 (Dec. 31, 2001).

Kalchbrenner, N. et al., "A Convolutional Neural Network for Modelling Sentences," Proc. of the 52nd Annual Mtg of the Assoc. for Computational Linguistics; Baltimore, Maryland, pp. 655-665 (2014).

Kim, Y., "Convolutional Neural Networks for Sentence Classification." arXiv preprint arXiv:1408.5882 (2014).

Mihalcea, R. & Tarau, P., "Textrank: Bringing order into text." Proc. of the 2004 Conf. on Empirical Methods in Natural Language processing. (2004).

Newman, M. E. J., "Scientific Collaboration Networks. II. Shortest Paths, Weighted Networks, and Centrality," Physical Review E 64:016132-1 to 016132-7 (2001).

Nobata, C. et al. "Abusive Language Detection in Online User Content." Proc. of the 25th International Conf. on World Vide Web. International World Wide Web Conferences Steering Committee (2016).

Park, J.-H. & Fung, P., "One-Step and Two-Step Classification for Abusive Language Detection on Twitter," arXiv preprint arXiv:1706.01206 (2017).

Silva, L. et al. "Analyzing the Targets of Hate in Online Social Media." 10th International AAAI Conf. on Web and Social Media. (2016).

Tai, K. S. et al., "Improved Semantic Representations from Tree-Structured Long Short-Term Memory Networks," arXiv preprint arXiv:1503.00075 (2015).

Wang, J. et al., "Dimensional Sentiment Analysis Using a Regional CNN-LSTM Model" Proc. of the 54th Annual Meeting of the Assoc. for Computational Linguistics (vol. 2: Short Papers) (2016).

White, S. & Smyth, P., "Algorithms for Estimating Relative Importance in Networks." Proc. of the 9th ACM SIGKDD International Conf. on Knowledge Discovery and Data mining. ACM (2003).

Yin, W. & Schütze, H., "Multichannel Variable-Size Convolution for Sentence Classification," arXiv preprint arXiv:1603.04513 (2016).

Zhang, H. et al., "YNU-HPCC at SemEval 2017 Task 4: Using a Multi-Channel CNN-LSTM Model for Sentiment Classification," arXiv preprint arXiv:1603.04513 (2016).

Zhang, Z. et al. "Detecting Hate Speech on Twitter Using a Convolution-GRU Based Deep Neural Network," European Semantic Web Conference. Springer Intl Pub AG; Cham, CH (2018).

* cited by examiner

NEURAL NETWORK SYSTEMS AND METHODS FOR TARGET IDENTIFICATION FROM TEXT

TECHNICAL BACKGROUND

Non-limiting examples of categories and speech include hate targets and hate speech respectively. The identification of hate targets is an interesting research area of significant interest. Prior and automatic identification of hate targets can help social media companies and security agencies to plan their actions. Such automated target identification is helpful for companies in selecting appropriate moderators to handle different hate targets effectively. Identifying such hate-targets is very useful in controlling the spread of hate speech and reducing its negative social impact.

The automatic identification of hate targets is different from the traditional hate speech classification task. Hate-Speech or offensive language, itself may contain several different hate targets. Other forms of research in hate speech such as racism or sexism, or both also may contain several different hate-targets. Identifying hate targets provides a different way of looking at the problem with different use cases. Hate messages have very high number of overlapping of words among different hate target classes, which makes most straightforward classifiers ineffective. Most hate tweets do not follow proper grammatical rules making them less informative and less structural compared to general tweets. Consequently, high dependencies on grammatical features such as syntactic parsers and subject-verb-object analyzers do not produce accurate useful results. A class imbalance problem occurs in which there are significant variations in the size of data for each of these classes. Most tweets have no contextual or background information. Accordingly, the classification task becomes a complex case compared to the short text classification task.

Due to the small number of classes and the availability of significant domain-specific information the task of hate speech classification is hampered by differences in inter-class features. For, example, categories like racism and sexism, or hate versus non-hate contain sufficient feature differences. However, a single category of sexism can belong to multiple hate targets. These factors make the task more complex compared to the traditional hate speech classification. These issues are by no means limited to hate speech classification and apply to classification of types of speech relevant to marketing, epidemiology, natural disasters, and security.

Overview

In accordance with the present disclosure, a neural network system is provided. The neural network system can comprise one or more neural networks, for example, a first neural network, a second neural network, and a third neural network. The first neural network can comprise a convolutional neural network (CNN) long short-term memory (LSTM) architecture. The first neural network can be configured to receive a primary data set comprising text messages and output a primary data structure. The output of the first neural network can comprise, for example, a text pattern-based feature. The second neural network can comprise a CNN architecture. The second neural network can be configured to receive a plurality of secondary data sets derived from the primary data set and output a plurality of secondary data structures. The third neural network can comprise a deep neural network (DNN) architecture. The third neural network can be configured to combine the primary data structure and the plurality of second data structures to produce a combined data structure, and then process the combined data structure to produce a categorized data structure comprising the text messages assigned to targets.

In accordance with the present disclosure, a method of operating a target identification system is provided. A primary data set comprising text messages can be received. A plurality of secondary data sets can be generated from the primary data set. The generation can comprise, for example, the production of a graph-based feature data set and a semantic feature data set. The primary data set can be processed using a first convolutional neural network (CNN) comprising long short-term memory (LSTM) to produce a primary data structure comprising a text pattern feature. The plurality of secondary data sets can be processed using a second CNN to produce a plurality of secondary data structures. The primary data structure and the plurality of secondary data structures can be combined to produce a combined data structure. The combined data structure can be processed using a deep neural network (DNN) configured as a classifier to output a categorized data structure comprising the text messages assigned to targets. The combined data structured can be, for example, a concatenated data structure.

In accordance with the present disclosure, a method of operating a target identification system is provided. A primary data set comprising text messages can be received. A graph can be constructed comprising nodes corresponding to words in the text messages and edges connecting nodes based on occurrence within a predetermined distance. Words biased by predetermined keywords in the graph can be identified to produce a first graph-based data set of a secondary data set. Words having a high load determined by a number of shortest path passes using a node corresponding to a word can be identified to produce a second graph-based data set of the secondary data set. Words having similarity to the predetermined keywords based on occurrence with the predetermined keywords within the predetermined distance can be identified to produce a semantic based data set of the secondary data set. The primary data set and a plurality of secondary data sets can be processed using one or more neural networks to output a categorized data structure comprising the text messages assigned to targets.

In accordance with the present disclosure, a neural network system is provided. The neural network system can comprise any number or types of neural networks. For example, the neural network system can comprise three neural networks including a first neural network, a second neural network, and a third neural network. The first neural network can comprise any number or types of layers. For example, the first neural network can comprise a first input layer, a first embedding layer, a first convolution layer, a first max-pooling layer, and a long short-term memory (LSTM) layer. The first input layer can be configured to receive and process a primary data set and yield a first input data structure. The first embedding layer can be configured to receive and process the first input data structure and output a first embedded data structure. The first convolutional layer can be configured to receive and process the first embedded data structure to yield a first convolutional data structure. The first max-pooling layer can be configured to receive and process the convolutional layer data structure to yield a first max-pooled data structure. The long short-term memory (LSTM) layer can be configured to receive and process the first max-pooled data structure to yield a LSTM data structure.

In accordance with the present disclosure, a method of operating a target identification system is provided. A primary data set comprising messages can be received, the messages comprising text, and the text comprising words. A plurality of secondary data sets can be generated from the primary data set. The primary data set can be input into a first neural network comprising a first convolutional neural network (CNN) with long short-term memory (LSTM) to yield a first neural network data structure. The secondary data set can be input into a second neural network comprising a second CNN to yield three second neural network data structures, wherein the secondary data set is inputted as a first channel comprising the first graph-based feature, a second channel comprising the second graph-based feature, and a third channel comprising the semantic feature. The first neural network data structure and the three second data structures can be concatenated to yield a concatenated data structure. The concatenated data structure can be processed using a deep neural network (DNN) configured as a classifier to receive the concatenated data structure and output a categorized data structure. The method can be performed wherein the primary data set comprises hate speech and the keywords comprise hate words. The method can be performed wherein the categorized data structure comprises a plurality of target categories, for example, comprising hate targets.

In accordance with the present disclosure, a computer program product for use with a computer is provided. The computer program product can comprise a non-transitory computer readable medium, wherein the non-transitory computer readable medium stores a computer program code, and the computer program code is executable by one or more processors to perform any method of the present disclosure.

DETAILED DESCRIPTION

Figure 1:
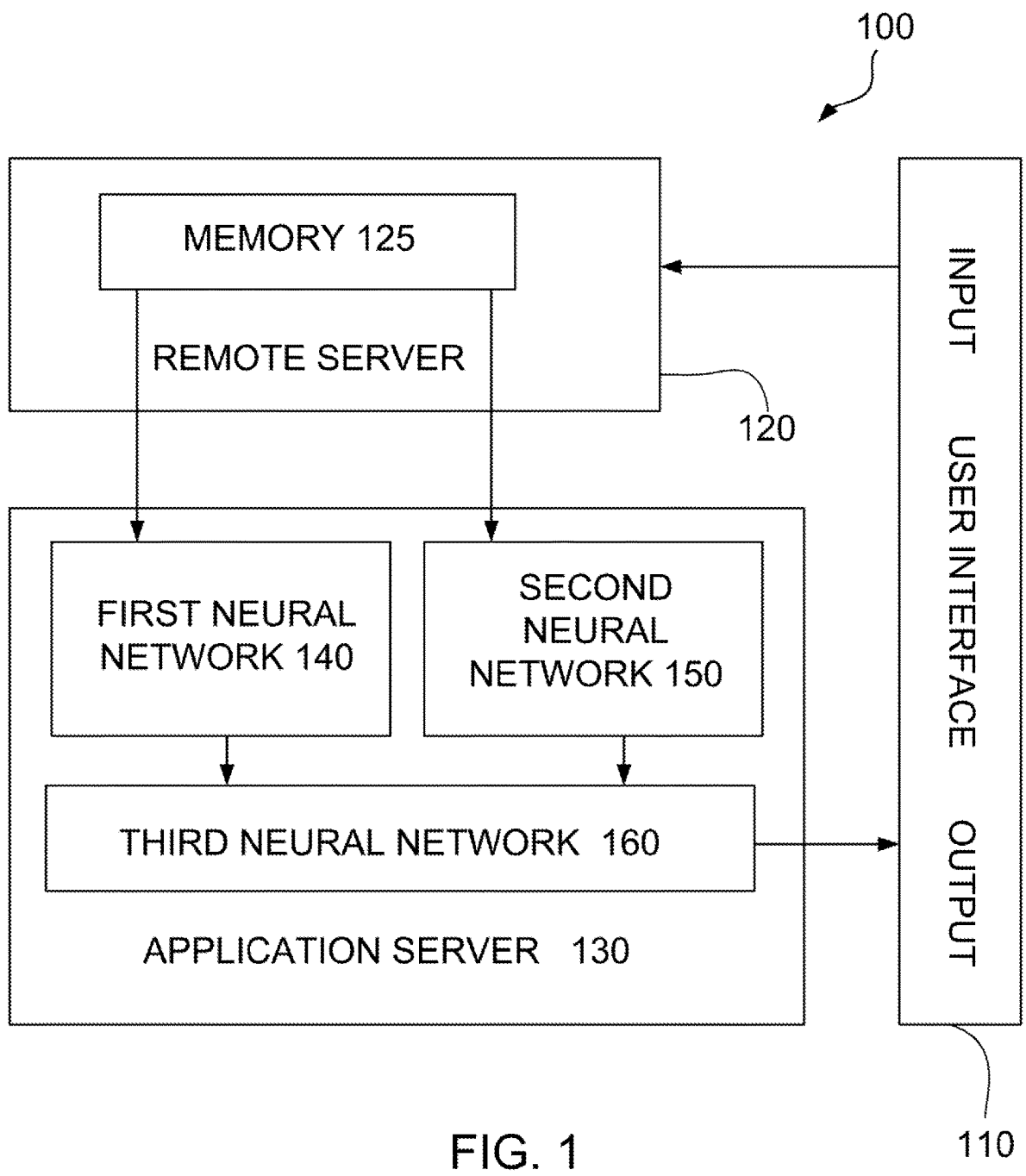
FIG. 1 is a schematic diagram of a neural network system in accordance with the present disclosure.

The present disclosure provides systems, methods, and computer programs that enable the analysis of text to determine relevant targets relevant to the context of the text. This text can be from any source, for example, print, electronic, voice, or the like. The text source can be of any unit size, but is particularly useful for analysis of text messages, for example, "TWEETS." Text messages can be used to communicate a wide variety of content and information, both positive and negative, superficial and substantive. An example of negative content is hate speech. The systems, methods, and computer programs of the present disclosure utilize a variety of neural networks to process text data either directly and/or after preprocessing to match text content with relevant targets, for example, hate speech with the target(s) of that speech.

In accordance with the present disclosure, a neural network system is provided with the understanding that one or more elements of one system, network, and the like can be substituted with or used in additional to those of another system, network and the like. The neural network system can comprise one or more neural networks, for example, a first neural network, a second neural network, and a third neural network. The first, second, and third neural networks can comprise any number, type, or combination of layers. The first neural network can comprise a convolutional neural network (CNN) long short-term memory (LSTM) architecture. The first neural network can be configured to receive a primary data set comprising text messages and output a primary data structure. The output of the first neural network can comprise, for example, a text pattern-based feature.

The second neural network can comprise a CNN architecture. The second neural network can be configured to receive a plurality of secondary data sets derived from the primary data set and output a plurality of secondary data structures. The third neural network can comprise a deep neural network (DNN) architecture. The third neural network can be configured to combine the primary data structure and the plurality of second data structures to produce a combined data structure, and then process the combined data structure to produce a categorized data structure comprising the text messages assigned to targets. The third neural network can be configured as a classifier comprising, for example, a plurality of binary classifiers configured to operate as a one versus all classifier.

A neural network of the present disclosure can have any desired or relevant number and/or type of layer. For example, at least one of the first, second, and third neural networks can comprise an input layer, an embedding layer, a max-pooling layer, a dropout layer, a flattening layer, a LSTM layer, a concatenating layer, a dense layer, or a convolution layer, or any combination thereof. The plurality of secondary data sets can comprise a graph-based feature, a semantic feature, or both. For example, the plurality of secondary data sets can comprise at least two graph-based features.

The second neural network can comprise a plurality of channels. Each channel of the plurality of channels can process a different data set of the plurality of secondary data sets. The second neural network can comprise a convolution layer. A filter length of the convolution layer can differ between channels. Some channels can have the same filter length and some channels can have different filter lengths. All channels can have the same filter length, or all channels can have a different filter length from the other channels. The plurality of channels can comprise any number of channels, for example, at least three channels comprising a first channel, a second channel, and a third channel. The plurality of secondary data sets can comprise a first data set, a second data set, and a third data set. For example, the first channel can comprise the first data set, the second channel can comprise the second data set, and the third channel can comprise the third data set. As a further example, the first data set can comprise a first graph-based feature, the second data set can comprise a second graph-based feature, and the third data set can comprise a semantic feature.

The text messages can comprise any type of speech or content of interest, for example, the text messages can comprise hate speech. The categorized data structure can comprise a plurality of target categories. The target categories can comprise, for example, hate targets. The hate targets can comprise any number, for example, one or more of, two or more, and the like, of behavior, religion, ethnicity, class, nationality, race, sexual orientation, disability, gender, and morphology (physical appearance). The hate targets can comprise, any number, for example, one or more, two or more, and the like, of race, religion, ethnic origin, national origin, sex (biological gender), disability, sexual orientation, and gender identity. The speech and target can comprise topics in addition to or in the alternative to hate. For example, the text messages can comprise language relating to an event, a product, an individual, a hobby, music, a location, an activity, a health issue, a utility issue, a safety issue, a weather phenomenon, a complaint, or an emotion, or any combination thereof. The target categories can comprise, for example, events, products, individuals, hobbies, music genres, songs, locations, activities, health issues, utility issues, safety issues, weather phenomena, complaints, or emotions, or any combination thereof.

The neural network system can further comprise one or more additional components for user interaction, data input, data output, data storage, data transfer, data processing, or the like. For example, the neural network system can further comprise a computer readable medium comprising the neural network, a processor configured to operate the neural network, and a user interface configured to enable a user to interact with the neural network. The same user interface or different user interfaces can be used to input data/parameters into the system and receive output from the system. The output can be displayed on a screen, a hard copy print-out, or the like. The output can be saved locally or remotely, and/or transmitted to a client for further analysis and/or use. Initial (pre) processing of data can be performed on the same or different equipment as the equipment used to run the neural networks. Any suitable hardware, software, and combination thereof can be employed in generating and running the neural networks.

In accordance with the present disclosure, a method of operating a target identification system is provided with the understanding that one or more elements, steps, and the like of one method can be added from and/or substituted with those from another. The method can comprise, for example, one or more of the following steps. A primary data set comprising text messages can be received. A plurality of secondary data sets can be generated from the primary data set. The generation can comprise, for example, the production of a graph-based feature data set and a semantic feature data set. The primary data set can be processed using a first convolutional neural network (CNN) comprising long short-term memory (LSTM) to produce a primary data structure comprising a text pattern feature. The plurality of secondary data sets can be processed using a second CNN to produce a plurality of secondary data structures. The primary data structure and the plurality of secondary data structures can be combined to produce a combined data structure. The combined data structure can be processed using a deep neural network (DNN) configured as a classifier to output a categorized data structure comprising the text messages assigned to targets.

The processing of the primary data set can comprise embedding, for example, as one or more matrices, the primary data set in the first CNN, and the processing of the plurality of secondary data sets comprises embedding the plurality of secondary data sets in the second CNN. The second CNN can comprise a plurality of channels comprising, for example, a first channel configured to process the graph-based data set and a second channel configured to process the semantic feature data set. Secondary data sets can be embedded, for example, as one or more matrices, into respective channels of the second CNN. The method can further comprise applying a different length filter to each filter. The combining can comprise concatenating the primary data structure and the plurality of secondary data structures, and further comprising flattening the primary data structure and the plurality of secondary data structures prior to the concatenation.

The generating can comprise, for example, the following steps. A graph can be constructed comprising nodes corresponding to words in the text messages and edges connecting nodes based on occurrence within a predetermined distance. Words biased by predetermined keywords in the graph can be identified to produce the graph-based data set, the graph-based data set being a first graph-based data set. Words having a high load determined by a number of shortest path passes using a node corresponding to a word can be identified to produce a second graph-based data set of the secondary data set.

In accordance with the present disclosure, another method of operating a target identification system is provided, with the understanding that one or more elements, steps, and the like of one method can be added from and/or substituted with those from another. The method can comprise one or more of the following steps. A primary data set comprising text messages can be received. A graph can be constructed comprising nodes corresponding to words in the text messages and edges connecting nodes based on occurrence within a predetermined distance. Words biased by predetermined keywords in the graph can be identified to produce a first graph-based data set of a secondary data set. Words having a high load determined by a number of shortest path passes using a node corresponding to a word can be identified to produce a second graph-based data set of the secondary data set. Words having similarity to the predetermined keywords based on occurrence with the predetermined keywords within the predetermined distance can be identified to produce a semantic based data set of the secondary data set. The primary data set and a plurality of secondary data sets can be processed using one or more neural networks to output a categorized data structure comprising the text messages assigned to targets.

The text messages used in the methods can comprise language relating to, for example, hate, an event, a product, an individual, a hobby, music, a location, an activity, a health issue, a utility issue, a safety issue, a weather phenomenon, a complaint, or an emotion, or any combination thereof. The categorized data structure can comprise a plurality of target categories. The target categories can comprise, for example, hate targets, events, products, individuals, hobbies, music genres, songs, locations, activities, health issues, safety issues, utility issues (for example, usage), weather phenomena, complaints, or emotions, or any combination thereof.

In accordance with the present disclosure, another neural network system is provided with the understanding that one or more elements of one system, network, and the like can be substituted with or used in additional to those of another system, network and the like. The neural network system can comprise any number, type, or combination of neural networks. For example, the neural network system can comprise three neural networks including a first neural network, a second neural network, and a third neural network. The first neural network can comprise any number, type, or combination of layers. For example, the first neural network can comprise a first input layer, a first embedding layer, a first convolution layer, a first max-pooling layer, and a long short-term memory (LSTM) layer. The first input layer can be configured to receive and process a primary data set and yield a first input data structure. The first embedding layer can be configured to receive and process the first input data structure and output a first embedded data structure. The first convolutional layer can be configured to receive and process the first embedded data structure to yield a first convolutional data structure. The first max-pooling layer can be configured to receive and process the convolutional layer data structure to yield a first max-pooled data structure. The long short-term memory (LSTM) layer can be configured to receive and process the first max-pooled data structure to yield a LSTM data structure.

The second neural network can comprise any number, type, or combination of layers. The second neural network can comprise, for example, a second input layer, a second embedding layer, a second convolutional layer, and a second max-pooling layer. The second input layer can be configured to receive and process a secondary data set and yield a second input data structure. The second embedding layer can be configured to receive and process the second input data structure and output a second embedded data structure. The second convolutional layer can be configured to receive and process the second embedded data structure to yield a second convolutional data structure. The second max-pooling layer can be configured to receive and process the second convolutional layer data structure to yield a second max-pooled data structure.

The third neural network can comprise any number, type, or combination of layers. The third neural network can comprise, for example, a concatenating layer and a deep neural network (DNN) architecture. The layer of the third neural network can be fully connected. The concatenating layer can be configured to concatenate output from the first and second neural networks to yield a concatenated data structure. The deep neural network (DNN) architecture can be configured as a classifier to receive the concatenated data structure and output a categorized data structure. The DNN architecture can comprise, for example, a first artificial neural network (ANN) node configured for rectified linear unit (ReLu) activation and a second ANN node configured for sigmoid activation.

The first and second max-pooling layers can be configured for k-max-pooling. At least one of the first, second, and third neural networks can comprise a dropout layer. The first, second, and third neural networks can all comprise at least one dropout layer. The first neural network can comprise a dropout layer between the max-pooling layer and the LSTM layer. The second neural network can comprise a dropout layer between the convolutional layer and the max-pooling layer. The third neural network can comprise a flattening layer prior to the concatenating layer.

The respective layers of the second neural network can be divided amongst the plurality of channels. Each channel of the plurality of channels can comprise a subset of the secondary data set. A filter length of the second convolution layer can differ between channels. The plurality of channels can comprise at least three channels comprising a first channel, a second channel, and a third channel. A filter length of the second convolution layer can be the same or different in each of the three channels.

The secondary data set of the neural network system can comprise a graph-based feature, a semantic feature, or both. The secondary data set can comprise two graph-based features. The graph-based feature can comprise, for example, a social graph-based feature. The second neural network can comprise a plurality of channels. The secondary data set can comprise a first subset, a second subset, and a third subset. The first channel can comprise the first subset, the second channel can comprise the second subset, and the third channel can comprise the third subset. The first subset can comprise a first graph-based feature, the second subset comprises a second graph-based feature, and the third subset comprises a semantic feature.

The primary data set, the secondary data set, or both can comprise language analytic data. For example, the language analytic data can comprise SMS-based text messages. The language analytic data can comprise social media-based messages. The language analytic data can comprise, for example, hate speech. The language analytic data can comprise, for example, language relating to an event, a product, an individual, a hobby, music, a location, an activity, a health issue, a utility issue, a safety issue, a weather phenomenon, a complaint, or an emotion, or any combination thereof.

The output of the first neural network can comprise a text pattern-based feature. The first graph-based feature can comprise bias-influenced terminology. The bias-influenced terminology can comprise a hate lexicon, the hate lexicon comprising hate keywords. The second graph-based feature can comprise a load associated with a number of shortest paths passing through respective nodes of the graph. The semantic feature can comprise terminology that is similar to or occur with hate keywords.

The classifier of the neural network system can comprise a plurality of binary classifiers configured to operate as a one versus all classifier. The first ANN node can comprise a plurality of first ANN nodes configured for ReLu activation. The plurality of first ANN nodes can comprise at least three nodes. The second ANN node can receive an output of the first ANN node. The categorized data structure can comprise any number of, for example, one or more of, two or more of, and the like, for example, a plurality of target categories. The target categories can comprise hate targets. The hate targets can comprise, for example, any number of behavior, religion, ethnicity, class, nationality, race, sexual orientation, disability, gender, and morphology. The hate targets can comprise, any number, for example, one or more, two or more, and the like, of race, religion, ethnic origin, national origin, sex (gender), disability, sexual orientation, and gender identity. There can be any number and/or type of categories. The target categories can comprise, for example, any number of events, products, individuals, hobbies, music genres, songs, locations, activities, health issues, utility issues, safety issues, weather phenomena, complaints, or emotions, or any combination thereof.

The neural network system can further comprise one or more of a computer readable medium comprising the neural networks, a processor configured to operate the neural network, and a user interface configured to enable a user to interact with the neural network. The user interface can be further configured to display a graphical representation of data comprised by the categorized data structure. The system can further comprise an application server comprising the computer readable medium and the processor, the user interface being in communication with the application server. The system can still further comprise a memory comprising the primary data set, the memory being accessible by the processor to retrieve the primary data set. The memory can be on the application server or on a remote storage medium accessible to the application server through a network.

In accordance with the present disclosure, a further method of operating a target identification system is provided with the understanding that one or more elements, steps, and the like of one method can be added from and/or substituted with those from another. The method can comprise one or more of the following steps. A primary data set comprising messages can be received, the messages comprising text, and the text comprising words. A plurality of secondary data sets can be generated from the primary data set. The generation can comprise constructing a graph comprising a plurality of nodes and a plurality of edges connecting the plurality nodes, wherein nodes represent the words and the edges represent relationships between the words. The graph can be, for example, a social graph. The nodes can be ranked based on an effect of bias, wherein the bias is based on a predetermined lexicon, the lexicon comprising keywords, to generate a first graph-based feature. Loads for nodes of the plurality of nodes can be weighed, wherein a load is based on a number of shortest paths passing through each of the nodes, to determine a second graph-based feature. A semantic feature can be extracted from the primary data set, wherein the semantic feature is a set of terms that is similar to or occurs with a keyword.

The primary data set can be input into a first neural network comprising a first convolutional neural network (CNN) with long short-term memory (LSTM) to yield a first neural network data structure. The secondary data set can be input into a second neural network comprising a second CNN to yield three second neural network data structures, wherein the secondary data set is inputted as a first channel comprising the first graph-based feature, a second channel comprising the second graph-based feature, and a third channel comprising the semantic feature. The first neural network data structure and the three second data structures can be concatenated to yield a concatenated data structure. The concatenated data structure can be processed using a deep neural network (DNN) configured as a classifier to receive the concatenated data structure and output a categorized data structure, the DNN comprising a first artificial neural network (ANN) node configured for rectified linear unit (ReLu) activation and a second ANN node configured for sigmoid activation.

The method can further comprise embedding the primary data set in the first neural network and embedding the secondary data set in the second neural network. The method can further comprise performing max-pooling in the first and second data sets. The method can further comprise flattening the first neural network data structure and the three second data structures prior to the concatenation. The method can comprise applying a different length filter to the three channels in the second CNN. The method can be performed wherein the primary data set comprises hate speech and the keywords comprise hate words. The method can be performed wherein the categorized data structure comprises a plurality of target categories. The method can be performed wherein the target categories comprise hate targets.

In accordance with the present disclosure, a computer program product for use with a computer is provided. The computer program product can comprise a non-transitory computer readable medium, wherein the non-transitory computer readable medium stores a computer program code. The computer program code can be executable by one or more processors to perform any method, combination, or portion thereof of the present disclosure.

FIG. 1 is a schematic diagram of a neural network system 100 in accordance with the present disclosure. Neural network system 100 can comprise a user interface 110 configured to input data, control the parameters of neural network system 100, and receive output data. A user using user interface 110 can affect transfer of primary data saved on a remote server 120 comprising a memory 125 to an application server 130. Application server 130 can comprise a first neural network 140, a second neural network 150, and a third neural network 160. Primary data can be fed directly or optionally pre-processed before passing it through the neural networks. Pre-processing can result in a plurality of secondary data. For example, primary data can be fed into first neural network 140 and the plurality of secondary data can be fed into second neural network 150. The output of the first and second neural networks can be combined and processed using third neural network 160. The output of third neural network 160 can be transferred to and displayed on user interface 110.

Figure 2:
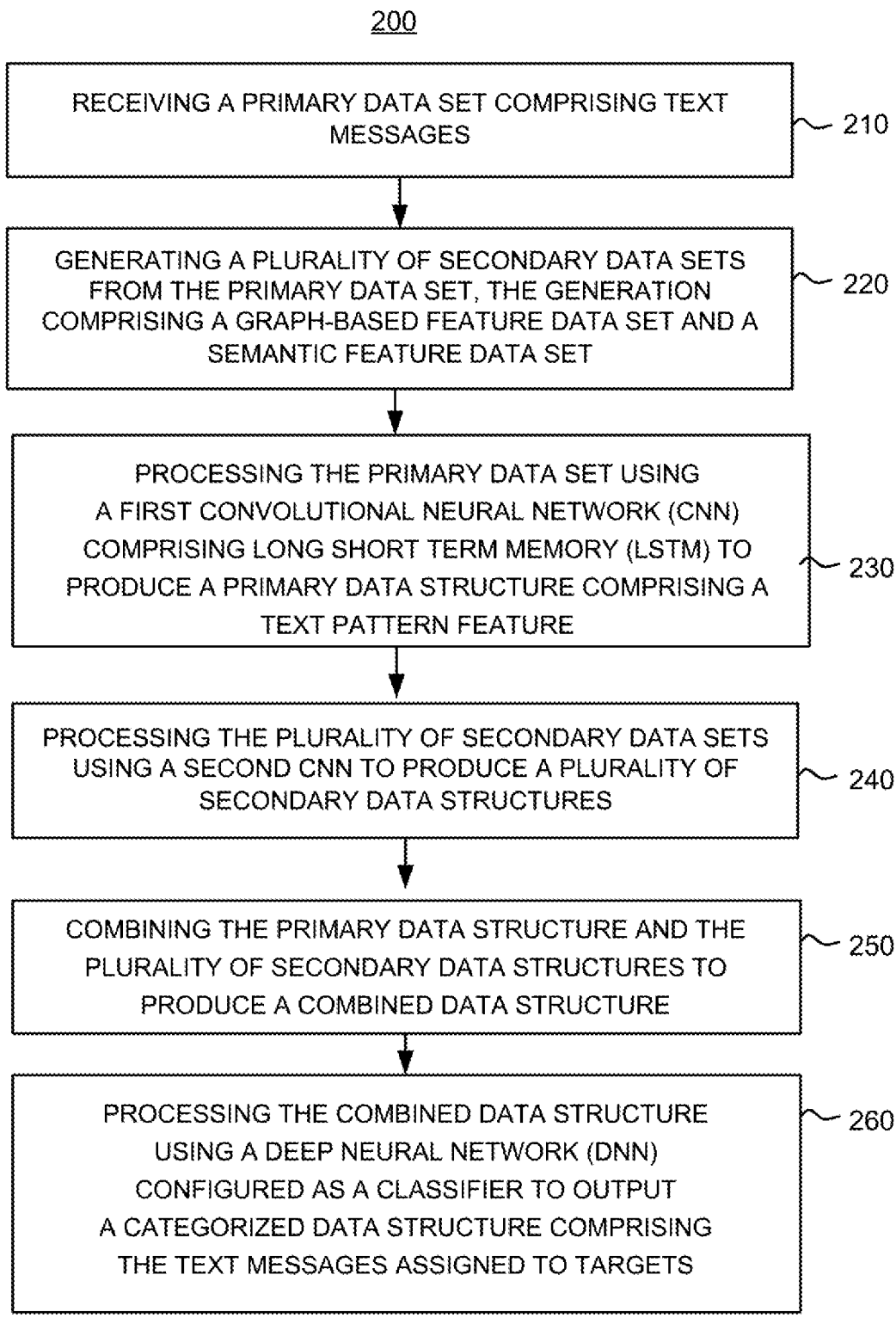
FIG. 2 is a flow diagram of a method of operating a neural network system in accordance with the present disclosure.

FIG. 2 is a flow diagram of a method 200 of operating a neural network system in accordance with the present disclosure. A primary data set comprising text messages can be received in a step 210. A plurality of secondary data sets can be generated from the primary data set in a step 220. The generation can comprise, for example, the production of a graph-based feature data set and a semantic feature data set. The primary data set can be processed in a step 230 using a first convolutional neural network (CNN) comprising long short-term memory (LSTM) to produce a primary data structure comprising a text pattern feature. The plurality of secondary data sets can be processed in a step 240 using a second CNN to produce a plurality of secondary data structures. The primary data structure and the plurality of secondary data structures can be combined in a step 250 to produce a combined data structure. The combined data structure can be processed in a step 260 using a deep neural network (DNN) configured as a classifier to output a categorized data structure comprising the text messages assigned to targets.

Figure 3:
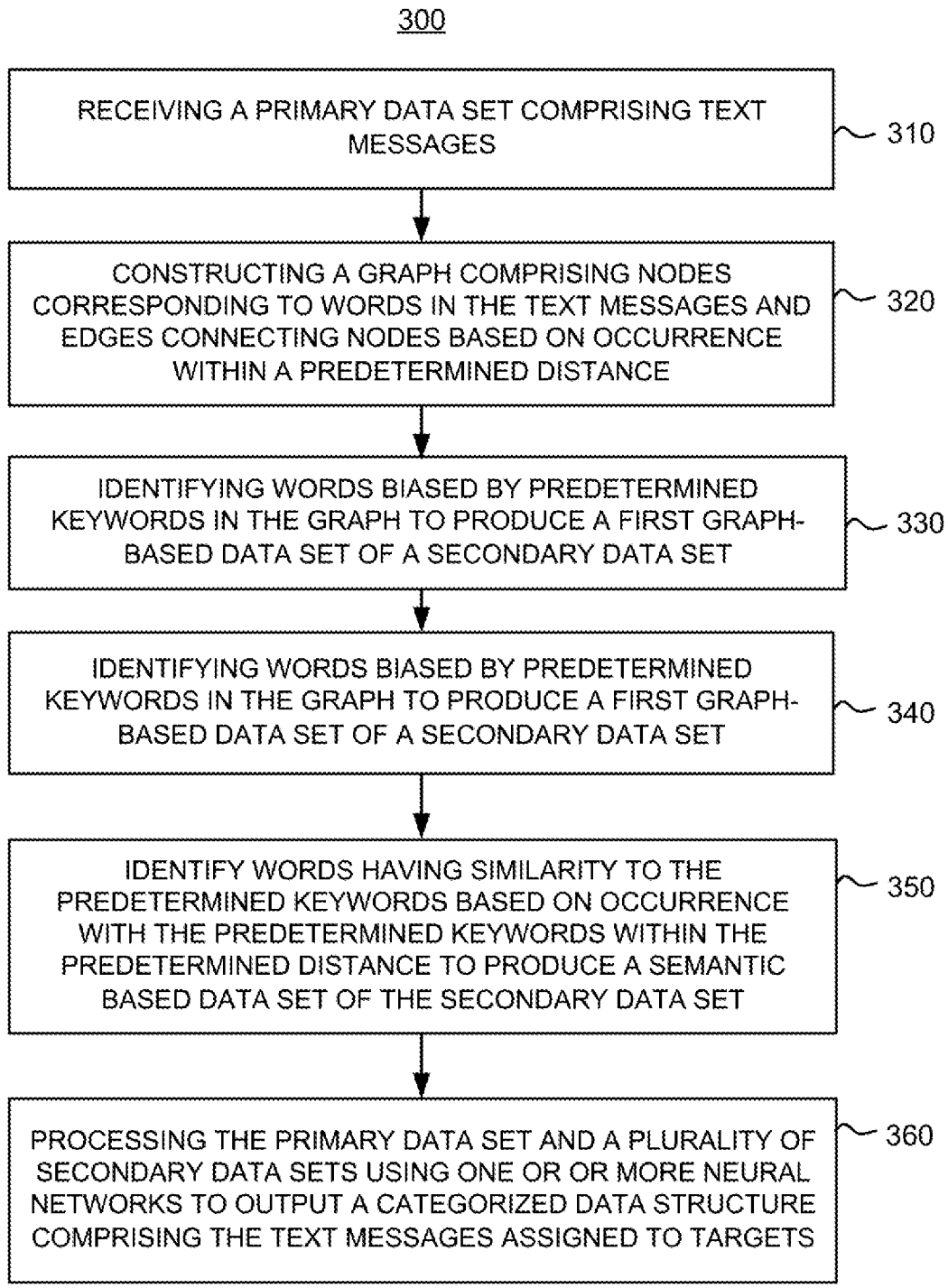
FIG. 3 is a flow diagram of another method of operating a neural network system in accordance with the present disclosure.

FIG. 3 is a flow diagram of another method of operating a neural network system in accordance with the present disclosure. A primary data set comprising text messages can be received in a step 310. A graph can be constructed in a step 320 comprising nodes corresponding to words in the text messages and edges connecting nodes based on occurrence within a predetermined distance. Words biased by predetermined keywords in the graph can be identified in a step 330 to produce a first graph-based data set of a secondary data set. Words having a high load determined by a number of shortest path passes using a node corresponding to a word can be identified in a step 340 to produce a second graph-based data set of the secondary data set. Words having similarity to the predetermined keywords based on occurrence with the predetermined keywords within the predetermined distance can be identified in a step 350 to produce a semantic based data set of the secondary data set. The primary data set and a plurality of secondary data sets can be processed in a step 360 using one or more neural networks to output a categorized data structure comprising the text messages assigned to targets.

Figure 4:
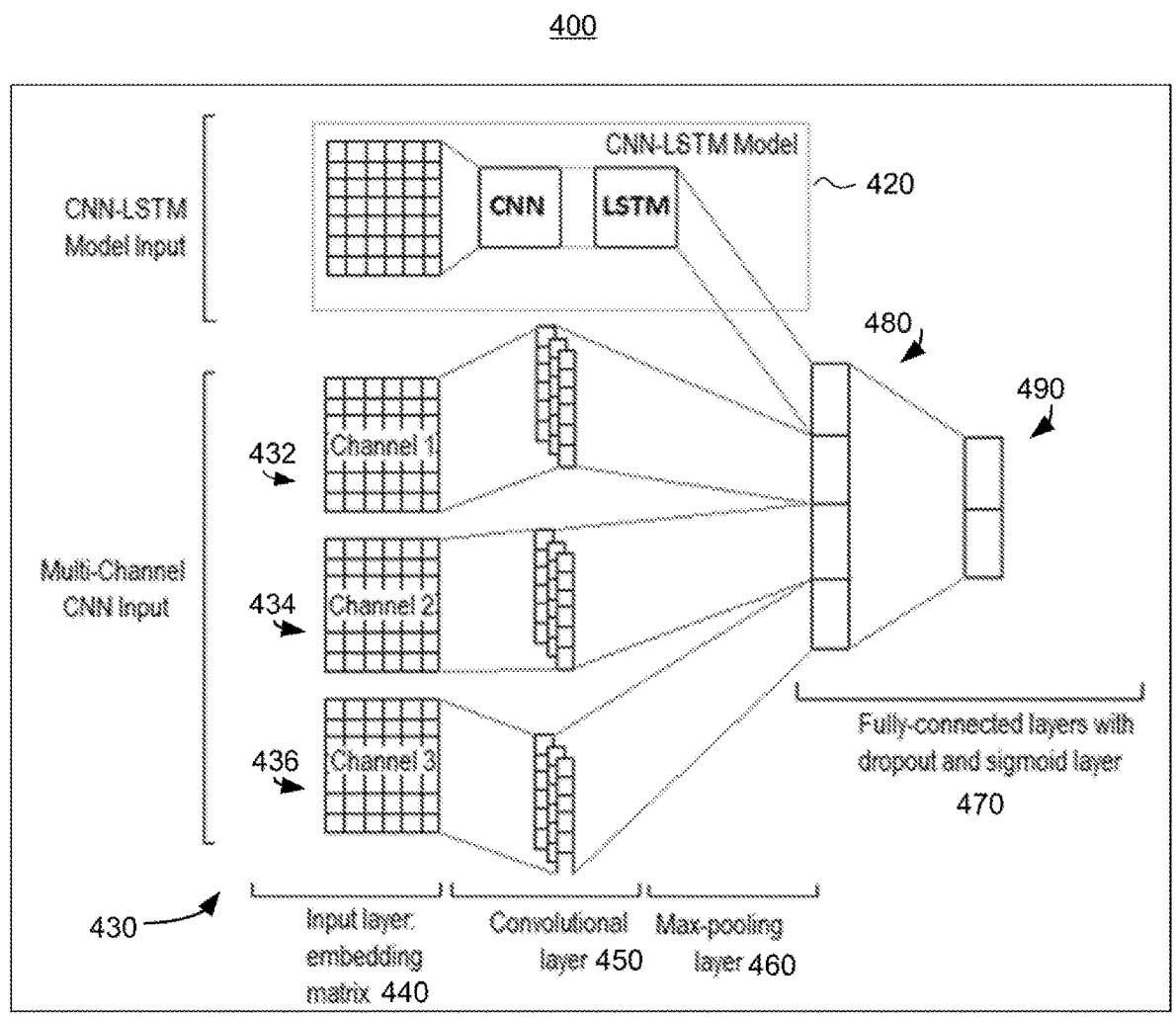
FIG. 4 is a schematic diagram of a neural network system in accordance with the present disclosure.

FIG. 4 is a schematic diagram of a neural network system 400 in accordance with the present disclosure. Neural network system 400 can comprise a first neural network 420, a second neural network 430, and a third neural network. First neural network 420 can have a CNN-LSTM architecture that processes a primary data set. Second neural network 430 can have a multi-channel CNN architecture comprising a first channel 432, a second channel 434, and a third channel 436. Primary data set can be pre-processed to produce a plurality of secondary data sets comprising a first secondary data set, a second secondary data set, and a third secondary set. First, second, and third secondary data sets can be processed using first, second, and third channels 432, 434, 436, respectively. The primary data set and the secondary data sets can each be input in an input layer into their respective networks/channels in the form of an embedding matrix 440. The data can be further processed through one or more convolutional layer 450 and max-pooling layer 460. The outputs of first and second neural networks 420, 430 can be processed by a third neural network 470 comprising a concatenating layer 480 and a DNN 490 comprising one or more layers.

Figure 5A:
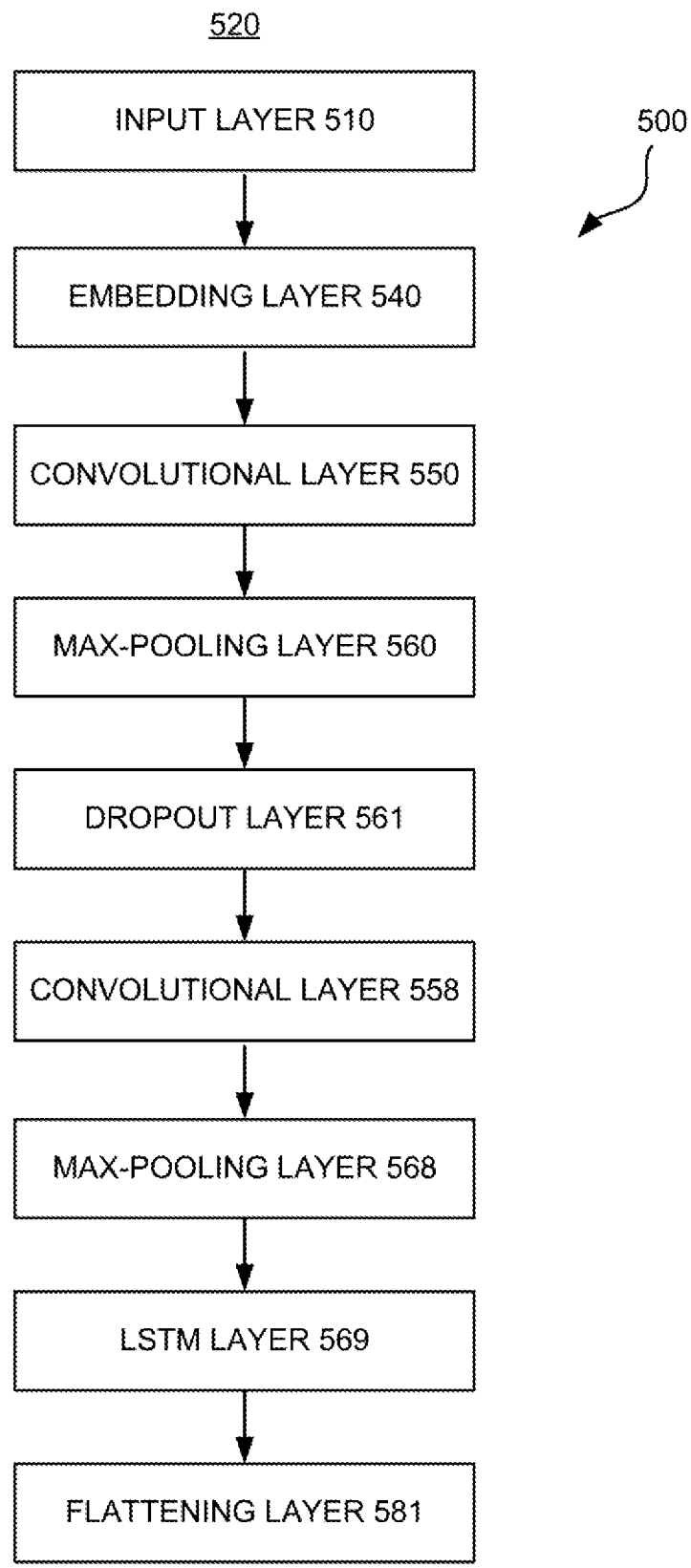
FIGS. 5A-5C depict a schematic diagram of an example of a system architecture for the neural network system shown in FIG. 4.
Figure 5B:
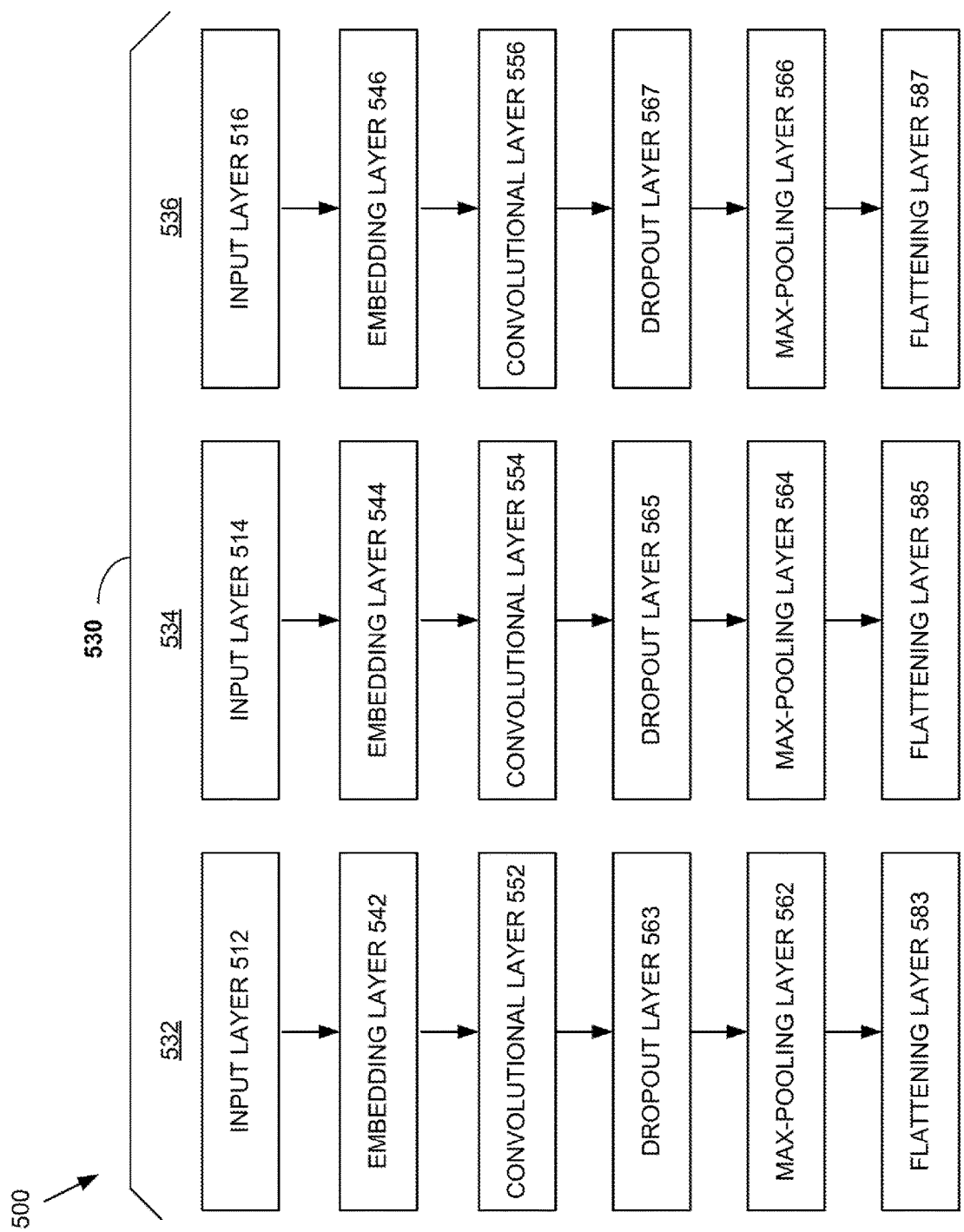
Figure 5C:
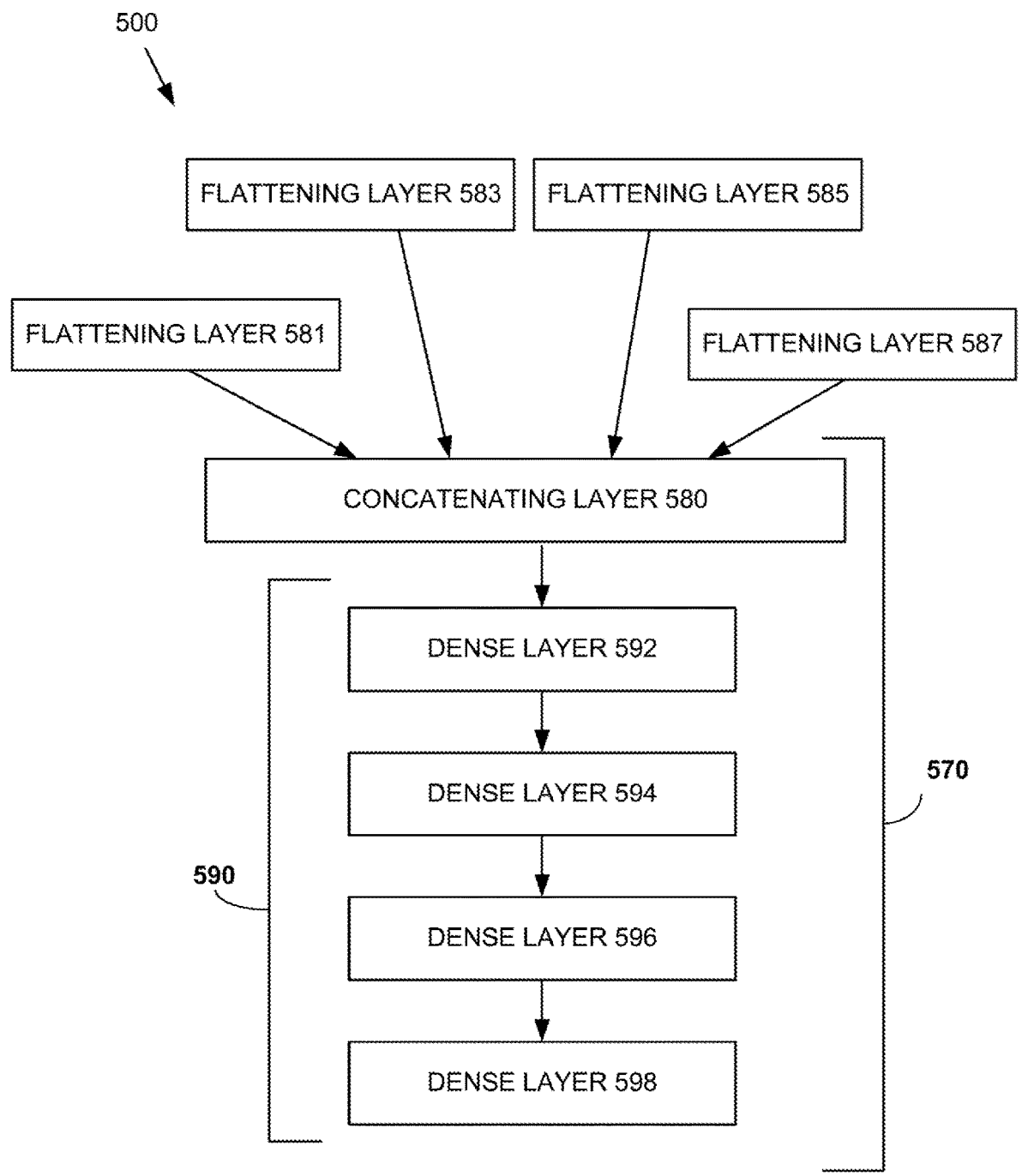

FIGS. 5A-5C depict a schematic diagram of an example of a system architecture 500 of neural network system 400 shown in FIG. 4. As shown in FIG. 5A, primary data set, initially input as an input layer 510, can be processed by first neural network 520, which can correspond to first neural network 420. The primary data set is progressively processed through layers of first neural network 520, which can comprise an embedding layer 540, a convolutional layer 550, a max-pooling layer 560, a dropout layer 561, a convolutional layer 558, a max-pooling layer 568, a LSTM layer 569, and a flattening layer 581.

The primary data set can be pre-processed using various techniques to produce a plurality of secondary data sets that can include first, second, and third secondary data sets. As shown in FIG. 5B, first, second, and third secondary data sets can be processed by second neural network 530, which can correspond to second neural network 430, through respective first, second, third channels 532, 534, 536, which can correspond to channels 432, 434, 436. First channel 532 can comprise an input layer 512, an embedding layer 542, a convolutional layer 552, a dropout layer 563, a max-pooling layer 562, and a flattening layer 583. Second channel 534 can comprise an input layer 514, an embedding layer 544, a convolutional layer 554, a dropout layer 565, a max-pooling layer 564, and a flattening layer 585. Third channel 536 can comprise an input layer 516, an embedding layer 546, a convolutional layer 556, a dropout layer 567, a max-pooling layer 566, and a flattening layer 587.

As shown in FIG. 5C, flattening layers 581, 583, 585, 587 can be concatenated by a concatenating layer 580 of third neural network 570, which can correspond to concatenating layer 470 and third neural network 470. Third neural network 570 can further comprise DNN 590, which can correspond to DNN 490. DNN 590 can comprise multiple layer, for example, dense layers 592, 594, 596, and 598.

Methods and systems for classifying speech into categories are provided using a multi-channel convolutional neural network (CNN) with features derived from social graphs, word embeddings, and text patterns recognized by the network. The social graph features refer to the features that can be derived from a domain specific rank algorithm based on the word-word co-occurrence graph. The domain specific information can be incorporated by looking up a speech lexicon. Social graph-based features, semantic features, and text-pattern-based features can be utilized to collect external knowledge for four input channels for a multi-channel convolutional neural network (CNN). In a social-graph-based feature-1, hate lexicons can be used as bias and top-ranked terms affected by this bias can be identified. These terms can be used as automatically calculated external knowledge. In social-graph-based feature-2, the load of any node can show how many shortest paths pass through that node. This feature can show the engagement of a node in the network.

Top ranked terms in text (after graph representation of text) can be identified and used as external knowledge. Stop words and regular verbs are removed from the list. Semantic features can be a set of terms present in a given tweet, which are similar to or co-occur with a hate word obtained by using hate lexicon. A word embedding vector trained model can be used to determine the semantic features. The model can comprise, for example, a neural network trained to reconstruct the linguistic contexts of words from text messages. The model can produce a vector space assigning words to vectors vector in the space positioned to that the vectors corresponding to words having a common or similar context are relatively near to one another. In the text pattern-based feature, a convolutional neural network (CNN) long short-term memory (LSTM) network can used to identify patterns of terms in the text. Each of the four input channels can use different filter lengths. To classify hate targets, three deep neural network (DNN) layers can be added on top of the multi-channel CNN. The system can be modified based on the laws of a particular jurisdiction. The system can work effectively on skewed and/or imbalanced data or short-text.

To extract the social graph-based features, text can be converted into a word graph of text. Unique non-stop word terms of the given text can be assigned as nodes of the graph. A link (edge) is formed between the two distinct words if they co-occur in the text within a window size of two words. The graph can be defined as G(V, E), where V={$V_1$, $V_2$, ..., $V_n$} and E={$V_iV_j$}, if i,j∈n and i≠j and $V_i$ and $V_j$ co-occur in a window of size two words. $V_1$, $V_2$, ... and $V_n$ represents distinct non-stop word terms in the text. This graph can be used to calculate two social graph features.

With the social-graph-based feature-1, personalized page rank-based scores can be represented as nodes of the graph. Hate words present in the text can be used as prior or personalization information. To collect local hate words, hate lexicon can be used. The ranking with the prior score of any node 'v' of the graph can be given as:

$$PPR(v)^{i+1} = (1-\beta)\left(\sum_{u \in adj(v)} P\left(\frac{v}{u}\right) PPR(v)^i\right) + \beta P_v$$

$PPR(v)^{i+1}$ represents the page rank with prior of node 'v' at (i+1)th iteration, adj(v) represents the adjacent node of node v, $P_v$ represents the backpropagation probability, and it determines how often one jumps back to node v. If "R" represents the set of root nodes then, prior or bias can be given as:

$$P_v = \begin{cases} 1/|R| & \text{for } v \in R \\ 0 & \text{Otherwise} \end{cases}$$

Selecting a root set that encompasses the entire graph, the relative importance converges to the graph's importance. Hate words present in the text can be used as bias or root words. After computation of personalized page rank score, the top, for example, 25 percent highest score terms that are targeted to hate can be selected.

With the social graph-based feature-2, the same graph can be used to compute the load feature. A data packet can be sent from a vertex i to j, for every ordered pair of vertices (i, j). For a given pair (i, j), the data packet can be transmitted along the shortest path between them. If there exist more than one shortest path, the data packet could encounter one or more branching points. In this case, it can be assumed that the data packet is divided evenly by the number of branches at each branching point as it travels. The load lk can be defined at a vertex k as the total amount of data packets passing through that vertex k when all pairs of vertices send and receive one unit of data packet between them. The time delay of data transfer at each vertex or edge is not taken into account so that all data are delivered in a unit time, regardless of the distance between any two vertices. The load weight of each of node of the graph can be computed. The top, for example, 30% nodes after sorting all nodes in descending order of their weight can be considered.

For computing semantic similarity-based feature, a word embedding vector trained model can be used to compute the semantic similarity between hate words and other words. Hate words present in the given sentence can be identified with the help of hate lexicons. Other words having some level of similarity with the hate words present in the sentence can also be identified. Based on the experimental evaluation and observations, a minimum similarity threshold value of, for example, 0.05 can be chosen.

For the multi-channel CNN with CNN-LSTM layer inputs, the multi-channel CNN can be combined with a CNN-LSTM layer to get the decision based on local N-grams and long sequential features. For the CNN-LSTM Layer Input, let "S" be the sentence length, that is, the padded to max-length "S" of training dataset, and "d" the word dimension. The initialized input for each channel can have the dimension (S×d). The words sentence can be represented as a series of words, wherein each of these words are non-stop word terms and maintain the same order as they exist in the original text. A total of three different channels having the same dimension can be used. Channel-1 can maintain the same order of text as present in the original text. However, some of the words can be replaced by string "0" to show the absence of actual words without changing the position. The list of terms extracted with the help of "social graph-based feature-1" can be used and those words are replaced as "0" in the text which is not present in the list. This approach allows for the same word order and position related information, that is, position in the sentence, to be maintained unchanged for non-"0" words and also for the dimensionality to be maintained. For Channel-2, similar changes in the text can be made as made in Channel-1 except that the word list can be obtained by using "social graph-based feature-2" for entire replacement operation. For Channel-3, a replacement process can be applied similar to the word arrangements applied in Channel-1. However, semantically similar terms from each of the sentences can be extracted, which are similar to hate-term present in that text. The rest of the words can be replaced by "0".

CNN-multi-channel model convolution and pooling can be performed. The CNN-multi channel model can use the three input channels. The model can pass the input through separate convolution and pooling layers. The output of the multi-channel model can be concatenated and fed as input to the next layer, that is, the fully connected layer. In the convolutional layer, variable length filters can be applied. For example, the size is set as 4 (four) for Channel-1, 5 (five) for Channel-2 and 5(five) for Channel-3. This setting can be performed by identifying the best performing setup. A dropout with value of, for example, 0.5 can be used before passing the output to Max pooling layer. For max-pooling, k-max pooling can be used, which pools the k-most active features in pooling. The k-max pooling can be used to sample down different length vectors into the same length before the fully connected layer. The pooling can be applied after the top convolutional layer because different filter lengths are used at the convolutional layer.

For the CNN Layer, a filter size five and max pooling can be used. The LSTM applied is also a basic LSTM. It can have, for example, the following basic functions:

a) Gate Operations:

$$c'_t = a^t = \tan h(W_c x^t + U_c h^{t-1} + b_c) = \tan h(\hat{o}^t)$$

$$i^t = \sigma(W_i x^t + U_i h^{t-1} + b_i) = \sigma(\hat{i}^t)$$

$$f^t = \sigma(W_f x^t + U_f h^{t-1} + b_f) = \sigma(\hat{f}^{2i})$$

$$o^t = \sigma(W_o x^t + U_o h^{t-1} + b_o) = \sigma(\hat{o}^t)$$

b) Memory Cell Update:

$$c^t = i^t \odot a^t + f^t \odot c^{t-1}$$

c) Hidden Layer Output:

$$h^t = o^t \odot \tan h(c^t)$$

Here, $c_t'$ represents input moderation gate at time 't' (also represented as $a^t$), $i^t$ represents input gate, $f^t$ represents forget gate, $o^t$ represents output gate, $c^t$ represents memory cell output and $o^t$ represents output gate. Similarly, $b_c$, $b_f$, $b_i$, $b_o$ are bias that can be used, $x^t$ is input at time 't', $h^{t-1}$ represents hidden layer output at time 't-1', $W_c$, $W_f$, $W$, $W_o$ refer to the weight matrix and so on. The output of CNN-LSTM layer can be fed to the fully connected layer.

Each of the four input layers can take, for example, separate inputs of the same size. The main parameter of the input layer can be "input shape"/"input_length," (i.e., the length of text feed to the network). This representation can be the length of input sequences, as would be defined for an input layer of a Keras model. For example, if all of the input texts/text-pieces can be comprised of 100 words, this number would be 100. The data can be passed to the corresponding embedding layers. The embedding layer can be the first hidden layer of a network. The embedding layer can specify, for example, three arguments. Argument-1 (input_dim) can be the size of the vocabulary in the text data. For example, if the data is integer encoded to values between 0-10, then the size of the vocabulary would be 11 words. Argument-2 (output_dim) can be the size of the vector space in which words will be embedded. Argument-2 can define the size of the output vectors from this layer for each word. For example, it could be 32 or 100 or even larger. Argument-3 (input_length) is the third argument. Glove embedding can be used with 100 dimensionality (latent factors per index). The vocabulary size can be data dependent and can be left unfixed.

The label conv1d_K is 1D convolution Layer (2D, 3D with image, video, and the like) can be used. Here K={1, 2, . . . ,3 . . . }. K can be used for numbering. The label max_pooling1d_K can represent the max pooling layer. The label dropout_K can represent the dropout. "K" can be the number as used above. The label lstm_K can represent the LSTM. The label flatten_K can represent the flatten layer. Generally, CNN and the like can generate multidimensional tensors as their outputs. To use a dense (a fully connected layer) after the convolution layers, the multidimensional tensors can be unstacked into a 1D tensor, which can be performed, for example, using Flatten.

At the fully connected layer, the outcomes of all three channels of CNN and the outcomes of CNN-LSTM layer can be concatenated. The concatenated data structure can be feed as input to two hidden layers of size 40 and 20 respectively with the rectified linear unit (ReLu) activation. A sigmoid activation can be applied to get the binary classification. To classify tweets into one of the ten hate categories, a one-vs-all classifier can be applied.

Example

To prepare the labeled hate target dataset, a tweet-dataset was used. The instructions given in Silva et al. was used to annotate the dataset. A small annotated dataset available with Silva et al. was included in the prepared dataset and used as a guidance example in the annotation process. After removal of duplicates, a total of 11913 tweets is obtained. The tweets are annotated into 10 categories. The sources did not contain the tenth dataset category "none," that is, tweets that do not fall into any of the nine hate categories. The first one thousand tweets of another relevant dataset containing tweets were used for the tenth category.

Table 1 contains the details of the experimental dataset available after annotations. The category "physical" was not obtained and instead the "nationality" category was used. An "other" category as discussed in Silva et al. was not obtained, and the tenth class "none" was used instead.

TABLE 1

| ID | Category | Tweet Count |
|---|---|---|
| 1. | Behavior | 75 |
| 2. | Religion | 30 |
| 3. | Ethnicity | 15 |
| 4. | Class | 32 |
| 5. | Nationality | 39 |
| 6. | Race | 1440 |
| 7. | Sexual orientation | 2455 |
| 8. | Disability | 2354 |
| 9. | Gender | 5473 |
| 10. | None | 1000 |
| | TOTAL | 12913 |

Because the categories, "behavior," "religion," "ethnicity," "class," and "nationality" contained fewer than 100 tweets, whole tweets were selected from these classes. The dataset is divided into an 80-20 ratio, that is, the top 80% was used as a training set and the rest of the data was used as test data. There was no overlap between training and test data. The following baselines were prepared. The Multi-Channel CNN baseline uses 3 channels to capture variable length N-grams with different filter length, that is, 4, 5, and 6. Because no difference was found between 3 channel and 4 channel systems, only a 3 channel system was used. In the experiment, this model was represented as model-1. The CNN-LSTM based classifier model was represented as model-2 in the experiment. The Attention-based LSTM model relates to "Scaled Dot-Product Attention." The input consists of queries and keys of dimension $d_k$, and values of dimension $d_v$. The dot products of the query were computed with all keys, each was divided by $\sqrt{d_k}$, and a softmax function was applied to obtain the weights on the values. The attention function was computed on a set of queries simultaneously, packed together into a matrix Q. The keys and values were also packed together into matrices K and V. The matrix of outputs was computed as:

$$\text{Attention}(Q, K, V) = \text{Softmax}\left(\frac{QK^T}{\sqrt{d_k}}\right)V$$

The Basic CNN-LSTM+ Multi-Channel CNN baseline concatenates the outputs of the "Multi-Channel CNN" and the "CNN-LSTM based classifier" and are passed through the dense layer, that is, the fully connected layer. The Micro-averaged F-measure score was used for evaluation of classifier performance. A very basic kind of preprocessing steps was performed including removal of noisy and non-alphanumerical symbols, emoticons, and usernames. A one-vs-all classifier setting was employed. The results as expressed as a Micro averaged F-measure score for different models are given in Table 2.

TABLE 2

| No. | Model Name | Micro Averaged F1 |
|---|---|---|
| Model-1 | Multi-Channel CNN | 67.04 |
| Model-2 | CNN-LSTM based classifier | 62.17 |
| Model-3 | Attention based LSTM model | 69.38 |
| Model-4 | Basic CNN-LSTM + Multi-Channel CNN | 70.08 |
| Model-5 | Basic CNN-LSTM + Multi-Channel CNN + Semantic-Similarity | 71.77 |
| Model-6 | Basic CNN-LSTM + Multi-Channel CNN + Semantic-Similarity + Load-Feature | 72.31 |
| Model-7 | Basic CNN-LSTM + Multi-Channel CNN + Semantic-Similarity + Social-Graph-based-Feature-2 | 73.92 |
| Model-8 | Basic CNN-LSTM + Multi-Channel CNN + Semantic-Similarity + Social-Graph-based-Feature-2 + Social-Graph-based-Feature-1 | 78.16 |

Model-8 performs better than the other models. The use of a personalized rank score gives a good performance boost. However, Model-7, which use "Load" feature from the social graph, also contributes in a slight increase in the result. The use of semantic similarity based feature (i.e., Model-6) also resulted in the increase in performance compare to the Model-5. The Model-5 is the starting model. The model-1, model-2, model-3, and model-4 correspond to the described baseline models (discussed above). The experimental results show that there is a significant improvement on micro-average F1 when incorporating social graph features.

The above description and associated figures disclose the best mode of the disclosure. Some aspects of the best mode may not fall within the scope of the disclosure as specified by the claims. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A neural network system comprising:
   a computer readable medium comprising:
      a first neural network comprising a convolutional neural network (CNN) long short-term memory (LSTM) architecture, the first neural network configured to receive a primary data set comprising text messages and output a primary data structure,
      a second neural network comprising a CNN architecture, the second neural network configured to receive a plurality of secondary data sets derived from the primary data set and output a plurality of secondary data structures, wherein the plurality of secondary data sets comprises a graph-based feature, a semantic feature, or both, and a third neural network comprising a deep neural network (DNN) architecture, the third neural network configured to:
  combine the primary data structure and the plurality of second data structures to produce a combined data structure, and
  process the combined data structure to produce a categorized data structure comprising the text messages assigned to targets; and
a processor configured to operate the first, second, and third neural networks.

2. The neural network system of claim 1, wherein at least one of the first, second, and third neural networks comprise a max-pooling layer, a dropout layer, or both.

3. The neural network system of claim 1, wherein the plurality of secondary data sets comprises at least two graph-based features.

4. The neural network system of claim 1, wherein the second neural network comprises a plurality of channels, and each channel of the plurality of channels comprises a different data set of the plurality of secondary data sets.

5. The neural network system of claim 4, wherein the second neural network comprises a convolution layer and a filter length of the convolution layer differs between channels.

6. The neural network system of claim 5, wherein:
the plurality of channels comprises at least three channels comprising a first channel, a second channel, and a third channel;
the filter length of the convolution layer is different in each of the three channels;
the plurality of secondary data sets comprising a first data set, a second data set, and a third data set;
the first channel comprises the first data set, the second channel comprises the second data set, and the third channel comprises the third data set; and
the first data set comprises a first graph-based feature, the second data set comprises a second graph-based feature, and the third data set comprises a semantic feature.

7. The neural network system of claim 1, wherein:
the text messages comprise hate speech;
the categorized data structure comprises a plurality of target categories; and
the target categories comprise hate targets; and the hate targets comprise two or more of behavior, religion, ethnicity, class, nationality, race, sexual orientation, disability, gender, and morphology.

8. The neural network system of claim 1, wherein:
the text messages comprise language relating to an event, a product, an individual, a hobby, music, a location, an activity, a health issue, a utility issue, a safety issue, a weather phenomenon, a complaint, or an emotion, or any combination thereof;
the categorized data structure comprises a plurality of target categories; and
the target categories comprise events, products, individuals, hobbies, music genres, songs, locations, activities, health issues, utility issues, safety issues, weather phenomena, complaints, or emotions, or any combination thereof.

9. The neural network system of claim 1, wherein the output of the first neural network comprises a text pattern-based feature.

10. The neural network system of claim 1, wherein the third neural network is configured as a classifier comprising a plurality of binary classifiers configured to operate as a one versus all classifier.

11. The neural network system of claim 1, further comprising
a user interface configured to enable a user to interact with the first, second, and third neural networks.

12. A method of operating a target identification system, the method comprising:
receiving a primary data set comprising text messages;
generating a plurality of secondary data sets from the primary data set, the generation comprising production of a graph-based feature data set and a semantic feature data set;
processing the primary data set using a first convolutional neural network (CNN) comprising long short-term memory (LSTM) to produce a primary data structure comprising a text pattern feature;
processing the plurality of secondary data sets using a second CNN to produce a plurality of secondary data structures;
combining the primary data structure and the plurality of secondary data structures to produce a combined data structure; and
processing the combined data structure using a deep neural network (DNN) configured as a classifier to output a categorized data structure comprising the text messages assigned to targets.

13. The method of claim 12, wherein the processing of the primary data set comprises embedding the primary data set in the first CNN, and the processing of the plurality of secondary data sets comprises embedding the plurality of secondary data sets in the second CNN.

14. The method of claim 12, wherein the combining comprises concatenating the primary data structure and the plurality of secondary data structures, and the method further comprises flattening the primary data structure and the plurality of secondary data structures prior to the concatenation.

15. The method of claim 12, wherein the generating comprises:
constructing a graph comprising nodes corresponding to words in the text messages and edges connecting nodes based on occurrence within a predetermined distance;
identifying words biased by predetermined keywords in the graph to produce the graph-based feature data set, the graph-based feature data set being a first graph-based feature data set; and
identify words having a high load determined by a number of shortest path passes using a node corresponding to a word to produce a second graph-based feature data set of the secondary data set.

16. The method of claim 12, wherein the second CNN comprises a plurality of channels comprising a first channel configured to process the graph-based feature data set and a second channel configured to process the semantic feature data set; the method further comprising applying a different length filter to each filter.

17. The method of claim 12, wherein:
the text messages comprise language relating to hate, an event, a product, an individual, a hobby, music, a location, an activity, a health issue, a utility issue, a safety issue, a weather phenomenon, a complaint, or an emotion, or any combination thereof;
the categorized data structure comprises a plurality of target categories; and the target categories comprise hate targets, events, products, individuals, hobbies, music genres, songs, locations, activities, health issues, utility issues, safety issues, weather phenomena, complaints, or emotions, or any combination thereof.

18. The neural network system of claim 1, wherein the plurality of secondary data sets comprises a graph-based feature data set, or a semantic feature data set, or both.

19. The neural network system of claim 1, wherein the plurality of secondary data sets comprises a graph-based feature data set and a semantic feature data set.

20. A computer program product comprising a non-transitory computer readable medium, wherein the non-transitory computer readable medium stores a computer program code for operating a neural network system, wherein the computer program code is executable by one or more processors of an application server of the system to:

receive a primary data set comprising text messages;

generate a plurality of secondary data sets from the primary data set, the generation comprising production of a graph-based feature, a semantic feature, or both;

process the primary data set using a first convolutional neural network (CNN) comprising long short-term memory (LSTM) to produce a primary data structure comprising a text pattern feature;

process the plurality of secondary data sets using a second CNN to produce a plurality of secondary data structures;

combine the primary data structure and the plurality of secondary data structures to produce a combined data structure; and process the combined data structure using a deep neural network (DNN) configured as a classifier to output a categorized data structure comprising the text messages assigned to targets.

\* \* \* \* \*